Aug. 21, 1951      R. A. YODER      2,564,826
TORQUE AND SPEED RESPONSIVE CLUTCH
Filed Sept. 27, 1948

INVENTOR.
Ray A. Yoder
BY
ATTORNEYS

Patented Aug. 21, 1951

2,564,826

UNITED STATES PATENT OFFICE 2,564,826

TORQUE AND SPEED RESPONSIVE CLUTCH

Ray A. Yoder, Orrville, Ohio

Application September 27, 1948, Serial No. 51,410

3 Claims. (Cl. 192—105)

The invention or discovery relates to a torque and speed responsive clutch of the centrifugally actuated type, and including a rotary driving member, a rotatable driven member and centrifugally actuated means interposed between the driving member and the driven member in such a manner that a driving engagement is made by the centrifugally actuated means between the driving member and the driven member after the driving member has attained a certain speed of rotation.

In a usual centrifugally actuated clutch the centrifugally actuated means has a fixed connection with the driving member and includes sets of parts which are in positions of disengagement with the driven member when the driving member is stationary or at speeds below the engaging speed, and which move radially outwardly with respect to the axis of rotation of the driven member to positions of engagement with the driven member at the engaging speed, at which time power is transmitted without slipping between the driving member and the driven member. and their speeds of rotation are the same.

There are many different particular arrangements of the parts of the centrifugally actuated means and their association with the driving member and the driven member in the usual centrifugally actuated clutch and most centrifugally actuated means for clutches include a great many rigid mechanical parts which must be carefully machined and carefully assembled with each other.

In other words the usual centrifugally actuated clutch includes a multiplicity of parts, requires a multiplicity of manufacturing operations, and the assembly of the parts is usually complicated, with the consequence that the cost of manufacture and maintenance is relatively high.

In my application for U. S. Letters Patent Serial No. 785,332, filed November 12, 1947, now abandoned, clutches are set forth which have a simplified construction and arrangement in which the total number of parts is greatly reduced as compared with usual centrifugally actuated clutches and which include one-piece resilient members as components of the centrifugal actuated means, and in one embodiment opposite centrifugally actuated rigid members are interposed between the driving member and the one-piece resilient members in an arrangement whereby after centrifugal actuated engagement of the centrifugal actuated means between the driving member and the driven member, there is a driving and clamping action between the driving member and the centrifugally actuated rigid members which is applied through the one-piece resilient member to the driven member.

In my application for U. S. Letters Patent Serial No. 14,290, filed March 11, 1948, now abandoned, clutches are set forth which include in one embodiment a rotary driving member, a rotatable driven member and centrifugally actuated means interposed between the driving member and the driven member, the centrifugally actuated means including only rigid members which make a centrifugally initiated driving and clamping connection directly between the driving member and the driven member without the interposition of centrifugally actuated resilient members.

The objects of the present invention and discovery include the provision of an improved centrifugally actuated clutch which generally has a simplified construction and arrangement, and more particularly which has a construction and arrangement in which the total number of parts is greatly reduced as compared with usual centrifugally actuated clutches, in which the number of mechanical parts requiring machining operations and intricate assembly is greatly reduced as compared with usual centrifugally actuated clutches, and in which rigid parts may be utilized throughout.

Further objects of the present invention and discovery include the provision of an improved centrifugally actuated clutch including parts operating generally in a manner similar to one embodiment of improved clutch set forth in my said application, Serial No. 785,332, and which includes a reduced number of parts, each of which may be made of rigid material, and including improvements of one embodiment of improved clutch set forth in my said application, Serial No. 14,290, whereby the manufacture and assembly of the parts of the improved clutch of the present invention and discovery is simplified, and whereby the arrangement of the parts of the improved clutch of the present invention and discovery is such that the operation of the centrifugally actuated means is controlled to provide simultaneous engagement of substantially the entire engaging surface areas of the centrifugally actuated rigid members between the driving member and driven member at a selected rotary speed of the driving member.

The foregoing and other objects are attained by the clutches parts, combinations, and sub-combinations which comprise the present invention or discovery, and the nature of which is set forth in the following general statement, and preferred embodiments of which are set forth in the following description, and which are particularly and distinctly pointed out and set forth in the appended claims forming part hereof.

The nature of the improved centrifugally actuated clutch of the present invention or discovery may be stated in general terms as including a rotary drive shaft member, a rotatable driven annular member, the drive shaft member and the driven annular member having a common axis of rotation and the annular member overlapping the shaft member, and preferably two opposite centrifugally actuated members interposed between the drive shaft member and the driven annular member, the centrifugally actuated members being located on opposite sides of a portion of the drive shaft member. The portion of the drive shaft member opposed by the centrifugally actuated members is formed with two opposite flat faces, and each centrifugally actuated member has a flat face opposite and abuttable with one of the flat faces of the drive shaft member. Also each centrifugally actuated member preferably has a cylindric external periphery, and the driven annular member preferably has a cylindric internal periphery whose diameter is substantially the same as the diameter of the cylindric external periphery of the centrifugally actuated members. Accordingly, when the improved clutch parts are in engagement, there is a driving and clamping action between the drive shaft member and the centrifugally actuated members, and between the centrifugally actuated members and the driven annular member. Each centrifugally actuated member includes at each end an arcuate rabbeted extension tongue overlapping one of the tongues of the other centrifugally actuated member, and each set of overlapping tongues have formed therein registrable bores each including an inner enlarged portion, and a helical spring is located and fits in each set of registering bores, and yieldingly connects the overlapping tongues.

By way of example, preferred embodiments of the improved centrifugally actuated clutches of the present invention or discovery, and parts thereof, are illustrated in the accompanying drawing forming part hereof, in which Figure 1 is a vertical axial sectional view with parts shown in fragmentary elevation, of one embodiment of the improved centrifugally actuated clutch hereof in the form of a clutch coupling;

Similar numerals refer to similar parts throughout the several views.

Figure 5:
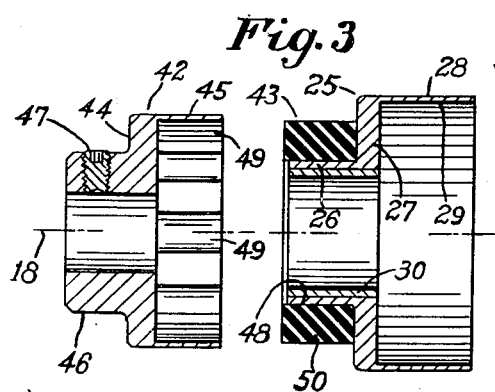
Fig. 5 is a vertical axial sectional view of parts of the improved clutch coupling, shown axially aligned with each other and spaced from each other.
Figure 5:
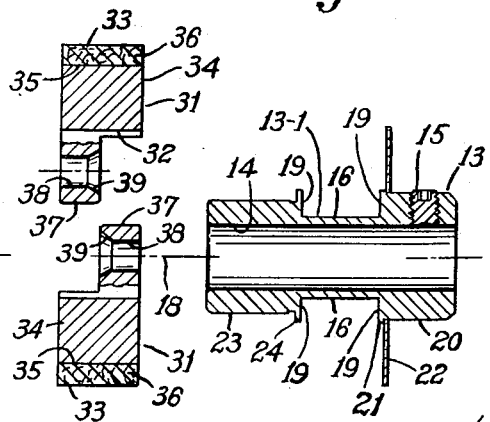

A preferred embodiment of the improved centrifugally actuated clutch of the present invention or discovery is indicated generally by 10, and is in the form of a clutch coupling providing a connection between one end of a drive shaft 11 and an adjacent end of a substantially aligned driven shaft 12. The clutch coupling 10 includes a hub or tubular drive shaft member indicated generally by 13 having a central bore 14 in which is fitted the connected end of the drive shaft 11 to which the hub 13 is secured as by a set screw 15 screwed in a threaded radial bore in the hub 13. The hub 13 has a central portion 13—1 in which there are formed two slots whose bottoms constitute opposite parallel flat faces 16 extending between opposite cylindrical segment faces 17 of the hub 13, the cylindrical segment faces 17 being coaxial with the axis of rotation of the hub 13 which is the longitudinal axis of its bore 14, and is indicated by the dot-dash line 18 in Fig. 1 and in Fig. 5, and the parallel flat faces 16 are equally spaced on opposite sides of the axis 18.

At each end of each slot bottom flat face 16 in the hub 13 there is formed a segmental slot side face 19. The hub 13 furthermore includes an outer end portion 20 in which the set screw 15 is located, and which is provided with an outwardly extending annular flange 21 the inner face of which includes extensions of the segmental slot side faces 19 at the outer ends of the slot bottom flat faces 16. The outer end portion 20 of the hub 13 is externally cylindric, and an annular closure disc 22 is fitted thereon and against the outer face of the flange 21.

The hub 13 also includes an inner end portion 23 which is externally cylindric and which is provided with an outwardly extending annular flange 24 having an inner face which includes extensions of the slot side faces 19 at the inner end of the flat faces 16. The cylindric external faces of the outer end portion 20 and the inner end portion 23 of the hub 13 are coaxial with the axis 18.

The clutch 10 furthermore includes a driven member indicated generally by 25 which itself includes at one end a hub portion 26 from one end of which extends an outwardly extending annular flange wall 27, and a cylindrical wall 28 extends from the outer periphery of the annular flange wall 27, the cylindrical wall 28 extending from one side of the annular flange wall 27 and the hub 26 extending from the other side of the annular flange wall 27. The cylindrical wall 28 has an inner cylindrical face 29 extending over the central slotted portion 13—1 of the hub 13.

In the driven member 25, the flange wall 27 and the hub 26 have a common bore in which is located a bearing bushing 30, the bore of which is coaxial with the inner cylindrical face 29 of the cylindrical wall 28, and the bore of the bushing 30 rotatably fits on the external cylindric surface of the inner end portion 23 of the hub 13, serving to journal the driven member 25 thereon.

For the purposes of the present improvements preferably two centrifugally actuated members each indicated generally by 31 are operatively interposed between the central slotted portion 13—1 of the hub 13 and the inner cylindrical face 29 of the cylindrical wall 28 of the driven member 25.

Each centrifugally actuated member 31 is generally segmental for the purposes of the present improvements, and, as shown, includes a flat inner face 32 opposite one of the slot bottom flat faces 16 of the central engaging portion of the hub 13, and each centrifugally actuated member 31 furthermore includes an outer cylindrical face 33 preferably having substantially the same radius as the radius of the inner cylindrical face 29 of the cylindrical wall 28 of the driven member 25. As shown, each centrifugally actuated member 31 includes a metal body 34 on which is formed the flat inner face 32 and in which is formed an external arcuate slot 35 in which is fitted an arcuate insert member 36 which may be made of fibrous material, and the outer cylindrical face 33 is the outer face of the arcuate insert member 36.

Figure 1:
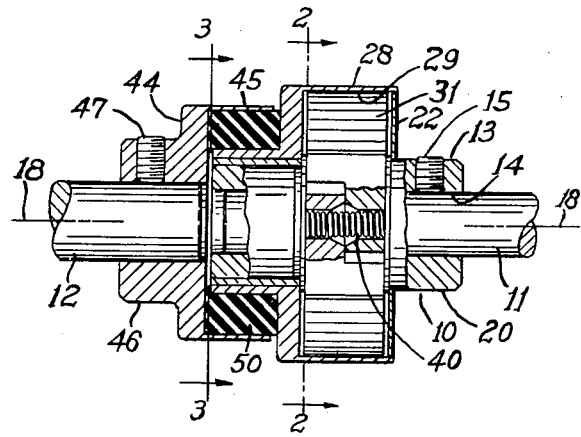
Figure 2:
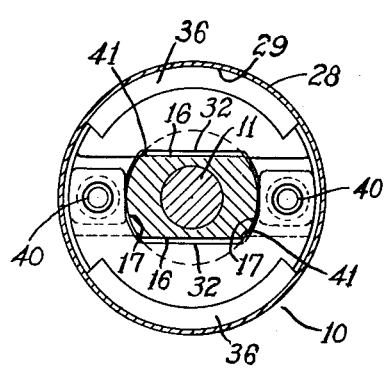
Fig. 2 is a transverse sectional view thereof as on line 2—2 Fig. 1.

Each of the centrifugally actuated members 31 furthermore includes at each end an arcuate rabbeted extension tongue 37 each having formed therein a bore 38 with an enlarged inner end portion 39. Each rabbeted extension tongue of each segmental member 31 overlaps one of the tongues of the other segmental member 31, and the bores 38 of each set of overlapping tongues 37 register with each other when the clutch is stationary as shown in Figs. 1 and 2, and an elongated helical spring 40 is located and fits in each set of registering bores 38. The thickness of each tongue 37 as shown and preferably, is substantially half the thickness of the body portion 34 of each segmental member 31, and the bores 38 of each of the two tongues 37 of each segmental member 31 are diametrically opposite each other and have axes parallel with the axis of rotation 18 of the clutch 10. The body portion 34 of each segmental member 31 has a thickness slightly less than the distance between the hub slot side faces 19 between which the body portion 34 is located, when the clutch parts are disengaged with its flat inner face 32 spaced a fraction of an inch, which may be in the neighborhood of $\frac{1}{32}$ inch, from the hub slot bottom face 16 extending between the side faces 19.

The hub or tubular drive shaft member 13, the driven member 25, and the body portion 34 of each segmental centrifugal actuated member 31 are preferably made of rigid material preferably metal such as steel. The fibrous material of which the arcuate insert members 36 are preferably made is also rigid, but when desired the insert members 36 may be made of resilient material such as rubber.

In the slotted portion 13—1 of the hub 13, each end of each slot bottom flat face 16 and the adjacent end of one of the cylindrical segment faces 17 intersect each other at a corner 41. In each segmenal member 31 the segmental height between the flat face 32 and the cylindrical face 33, that is the length of the bisector of a segmental face of the member which is perpendicular to the flat face 32, is slightly less than the similar distance between a flat face 16 of the hub 13 and the inner cylindrical surface 29 of the cylindrical wall 28 of the driven member 25.

As shown the clutch coupling 10 is a flexible clutch coupling in which the driven member 25 may be otherwise termed a first driven member, and the clutch coupling 10 furthermore includes a second driven member indicated generally by 42 and resilient key means indicated generally by 43 interposed between and in engagement with the first driven member 25 and the second driven member 42.

The first driven member 25 as shown may be otherwise described as a first cup member in which the annular flange wall 27 and the cylindrical wall 28 constitute respectively a cup bottom wall and a cup side wall the hub portion 26 extending from the outside face of the cup bottom wall 27.

Similarly as shown the second driven member 42 constitutes a second cup member including an annular cup bottom wall 44 and a cylindrical cup side wall 45 extending from the periphery of the cup bottom wall around its inside face. A tubular hub portion 46 extends from the outside face of the cup bottom wall 44 and has formed therein a threaded bore in which is screwed a set screw 47 by means of which the second driven member 42 of the clutch coupling 10 is secured to the driven shaft 12.

Figure 3:
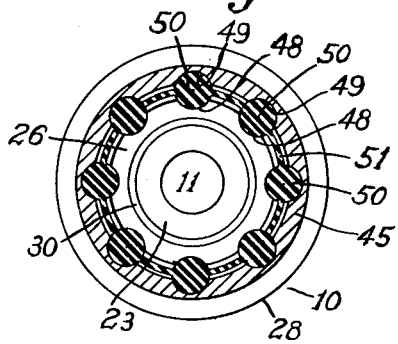
Fig. 3 is another transverse sectional view thereof as on line 3—3, Fig. 1.
Figure 4:
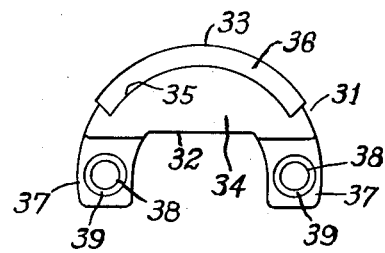
Fig. 4 is a detached detail elevational view of one of the centrifugally actuated members of the clutch coupling.

The outer face of the hub portion 26 of the first driven member 25 has formed therein a plurality of outwardly opening cylindrical grooves 48 equally spaced from each other circumferentially and parallel with each other and with the axis of rotation 18. The inner face of the cylindrical cup side wall 45 of the second driven member 42 has formed therein a plurality of inwardly opening cylindrical grooves 49 equally spaced from each other circumferentially and parallel with each other and with the axis of rotation 18. The number of grooves 49 is equal to the number of grooves 48, and the grooves all have the same radius of curvature. In the assembled positions of the parts of the clutch coupling 10, as best shown in Fig. 3, the axis of curvature of each outwardly opening groove 48 coincides with the axis of curvature of one of the overlapping inwardly opening grooves 49, and a cylindrical key 50 of resilient material such as rubber is interposed and fits between each set of overlapping grooves 48 and 49.

Preferably as shown the side by side cylindrical keys 50 are connected with each other by cylindrical web walls 51, each web wall 51 extending between and having its ends connected with two of the keys 50, and the keys 50 and web walls 51 constitute a one-piece annular multikey member made of resilient material such as rubber.

In the operation of the improved clutch 10, when the drive shaft member or hub 13 is stationary, the segmental centrifugally actuated members 31 assume positions relative to the other parts of the clutch, such as shown in Fig. 2, in which there is no driving engagement between the hub drive shaft member 13, the segmental members 31, and the driven member 25. After the drive shaft 11 and the attached hub drive member 13 of the clutch 10 attain a certain rotary speed, centrifugal force causes the segmental centrifugally actuated members 31 to be thrown out so that their outer cylindrical surfaces 33 hug and engage the inner cylindrical surface 29 of the clutch driven member 25. At the same time relative angular movement occurs between the slotted portion 13—1 of the hub 14 and the flat faces 32 of the segmental members 31 with the result that two of the diagonally opposite corners 41 of the slotted portion 13—1 of the hub 13 assume a clamping abutment or engagement, each with one of the flat faces 32 of one of the segmental centrifugally actuated members 31, whereby the clutch parts are in tight driving engagement with each other under the combined action of centrifugal force and clamping force, as is the similar case in the operation of the clutch shown in my application for U. S. Letters Patent, Serial No. 14,290.

In the present improved clutch 10, the helical springs 40 constitute spring means connecting the segmental members 31 with each other at opposite sides of the hub 13, thereby providing a convenient means of assembling the segmental members 31 on the hub 13, and also providing a yielding resistance to the movement of the segmental members 31 outwardly under the action of centrifugal force. By selecting a suitable strength for the springs 40, the speed of rotation may be fixed at which driving engagement takes place between the drive hub 13, the segmental centrifugally actuated members 31, and the driven member 25.

Each helical spring 40 extending through a set of registering bores 38 in the overlapping tongues 37 of the centrifugally actuated members 31 provides a yielding connection between the set of overlapping or adjacent end portions of the centrifugally actuated members 31, and each spring 40 coacting with the enlarged inner end portions 39 of the bores 38, provides a loose connection between a set of the overlapping or adjacent end portions of the centrifugally actuated members 31.

As is usual in any centrifugally actuated clutch, when the resistance to rotation of the clutch driven member 25 is beyond a certain amount, due to jamming of driven parts, or the like, slippage will occur between the segmental members 31 and the clutch driven member 25.

The embodiments of the present invention or discovery illustrated and described herein are by way of example, and the scope of the present invention or discovery is not limited to the same or to the particular details thereof but is commensurate with any and all novel subject matter contained herein which may at any time properly under the patent laws be set forth in the claims hereof or originating herein, and the elements of any such claims are intended to include their reasonable equivalents.

I claim:

1. In a clutch and the like, a rotatable drive shaft member, a driven member rotatably mounted with respect to the drive shaft member excepting when engaged therewith, the drive shaft member having a plurality of clamping portions each formed with a corner, and the driven member having a portion overlapping the clamping portions of the drive shaft member, and the overlapping portion of the driven member having an inner face extending about the clamping portions of the drive shaft member, and a centrifugally actuated member interposed between each clamping portion of the drive shaft member and the inner face of the overlapping portion of the driven member, each centrifugally actuated member having an external face engageable with the inner face of the overlapping portion of the driven member, and each centrifugally actuated member having an inner face located for clamping engagement by the corner of its associated clamping portion of the drive shaft member, each centrifugally actuated member having an end portion overlapping an adjacent end portion of another centrifugally actuated member, each of one or more sets of overlapping end portions of the centrifugally actuated members having registrable bores formed therein and a yielding connecting member located in the registering bores.

2. In a clutch and the like, a rotatable drive shaft member, a driven member rotatably mounted with respect to the drive shaft member excepting when engaged therewith, the drive shaft member having a plurality of clamping portions each formed with a corner, and the driven member having a portion overlapping the clamping portions of the drive shaft member, and the overlapping portion of the driven member having an inner face extending about the clamping portions of the drive shaft member, and a centrifugally actuated member interposed between each clamping portion of the drive shaft member and the inner face of the overlapping portion of the driven member, each centrifugally actuated member having an external face engageable with the inner face of the overlapping portion of the driven member, and each centrifugally actuated member having an inner face located for clamping engagement by the corner of its associated clamping portion of the drive shaft member, each centrifugally actuated member having an end portion overlapping an adjacent end portion of another centrifugally actuated member, each set of overlapping end portions of the centrifugally actuated members having registrable bores formed therein and a helical spring connecting member located in the registering bores.

3. In a clutch and the like, a rotatable drive shaft member, a driven member rotatably mounted with respect to the drive shaft member excepting when engaged therewith, the drive shaft member having a plurality of clamping portions each formed with a corner, and the driven member having a portion overlapping the clamping portions of the drive shaft member, and the overlapping portion of the driven member having an inner face extending about the clamping portions of the drive shaft member, and a centrifugally actuated member interposed between each clamping portion of the drive shaft member and the inner face of the overlapping portion of the driven member, each centrifugally actuated member having an external face engageable with the inner face of the overlapping portion of the driven member, and each centrifugally actuated member having an inner face located for clamping engagement by the corner of its associated clamping portion of the drive shaft member, each centrifugally actuated member having an end portion overlapping an adjacent end portion of another centrifugally actuated member, each of one or more sets of overlapping end portions of the centrifugally actuated members having registrable bores formed therein and a helical spring connecting member located in the registering bores.

RAY A. YODER.

REFERENCES CITED

The following references are of record in the file of this patent:

UNITED STATES PATENTS

| Number | Name | Date |
|---|---|---|
| 1,032,524 | Wiard | July 16, 1912 |
| 2,016,643 | Lowndes | Oct. 8, 1935 |
| 2,036,586 | Le Porin | Apr. 7, 1936 |
| 2,251,588 | Gilbert | Aug. 5, 1941 |
| 2,283,325 | Fawick | May 19, 1942 |
| 2,301,849 | Bialy | Nov. 10, 1942 |
| 2,338,476 | Witthop | Jan. 4, 1944 |
| 2,373,462 | Crow | Apr. 10, 1945 |
| 2,382,228 | Howell | Aug. 14, 1945 |
| 2,452,111 | Eaton | Oct. 26, 1948 |
| 2,489,688 | Vitoux | Nov. 29, 1949 |